Jan. 31, 1967     C. S. OCHS     3,301,399

DETECTION MECHANISM FOR COCKED CAPS

Filed Jan. 20, 1964     7 Sheets-Sheet 1

INVENTOR.
CHARLES S. OCHS
BY
ATTORNEY

Fig. 2.

INVENTOR.
CHARLES S. OCHS
BY
ATTORNEY

Jan. 31, 1967   C. S. OCHS   3,301,399
DETECTION MECHANISM FOR COCKED CAPS
Filed Jan. 20, 1964   7 Sheets-Sheet 4

INVENTOR.
CHARLES S. OCHS
BY
ATTORNEY

INVENTOR.
CHARLES S. OCHS
BY
ATTORNEY

United States Patent Office 3,301,399
Patented Jan. 31, 1967

3,301,399
DETECTION MECHANISM FOR
COCKED CAPS
Charles S. Ochs, Lancaster, Ohio, assignor to Anchor Hocking Glass Corporation, Lancaster, Ohio, a corporation of Delaware
Filed Jan. 20, 1964, Ser. No. 339,017
11 Claims. (Cl. 209—90)

The present invention relates to a detecting mechanism and more particularly to a cocked cap detecting mechanism which will detect whether or not a closure cap has been properly positioned on a container.

The present invention is adapted to be used with sealing machines which seal containers with closure caps. In such sealing machines a closure cap is usually first positioned loosely on the container finish and, if the cap be of the screw type, such as a twist cap, a suitable torque mechanism then twists the cap lightly into engagement with the container threads.

The container is then passed through the sealing mechanism where the closure cap is brought into a tightly sealed relationship with respect to the container finish.

It sometimes happens that either due to a malfunctioning of the sealing machine or to a defect in either the container or the closure cap, a closure cap is not properly positioned on a container so that it is slightly tilted with relation to the container finish, i.e., it is a "cocked cap." Such cocked caps may result in improper seals, damage to the sealing mechanism, or breakage of the container. It is therefore desirable to detect such cocked caps so that the container may be ejected from the sealing line before or after the final sealing.

Cocked caps while often resulting in improper seals, damaged caps, and containers are often forced downwardly and leveled by the relatively great force applied to the caps during the final sealing application. Where sealing machines apply such large forces as is often the case in straight-line sealing machine, it is necessary to detect the cocked caps before the final sealing application since even damaged caps and containers may have level cap tops after the sealing operation. Where less force is used in the actual sealing as is sometimes the case, for example, in rotary machines it may be preferable to place the detector in position after the sealing operation since cocked caps fed into the sealing devices normally will remain cocked after sealing and since this position of the detector will also detect improper seals where a cocking of the cap has occurred during the sealing operation even though the cap was originally applied correctly to the container before it entered the final sealing device.

The present invention has for one of its objects the provision of an improved detecting mechanism for detecting cocked caps.

Another object of the present invention is to provide an improved detecting mechanism which will operate at faster speeds.

Another object of the present invention is the provision of an improved detecting mechanism which has an improved memory mechanism so that removal of a cocked cap can take place at a point spaced from the detecting station.

Another object of the present invention is the provision of an improved detecting mechanism which will detect cocked caps irrespective of variations in the height of the container.

Another object of the present invention is the provision of an improved detecting mechanism which is relatively simple to maintain.

Another object of the present invention is to provide an improved detecting mechanism which can be used either on straight line or rotary sealing machines.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Referring more particularly to the drawings and particularly to FIGS. 1 to 7 which show the present invention adapted for use on a straight line sealing machine, a cocked cap detecting unit, generally designated by the reference numeral 1 (FIG. 3) is mounted over a frame 2. The frame 2 includes a conveyor 4 driven by a drive shaft 23 through gearing (not shown) in gear boxes 24 and 25. The conveyor 4 is adapted to move a plurality of containers 5 beneath a cap pickup mechanism 150 comprising a pair of rails 151 and a floating shoe 152 provided with a plurality of springs 153. A pair of detecting fingers 6 and 11a depend from the detecting unit 1 and are adapted to be responsive to the floating shoe 152.

Each container 5 has a closure cap 7 loosely mounted thereon, i.e. not tightly applied thereto. Each closure cap 7 generally comprises a cover portion 3 and a skirt portion 3a depending from cover portion 3. The floating shoe 152 is adapted to be responsive to the position of the closure cap. Hence, if the closure caps 7 are properly positioned on the container the floating shoe 152 is not affected and the fingers 6 and 11a will not be affected. However, if a closure cap, such as 7a, is cocked up, it will tilt or otherwise affect floating shoe 152 and raise the fingers 6 and 11a which will energize or activate a rejection unit, generally designated by the reference number 8, to move the defective container 5a (broken line in FIG. 1), having the cocked cap 7a thereon, off the conveyor 4.

Since the rejection unit 8 is spaced from the detecting unit 1 as, for example, beyond the sealing head which performs the final sealing operation, a memory unit 9 is provided which will memorize or store the fact that a particular container 5a has been detected by the finger 6 as having a cocked cap and which will cause the rejection unit 8 to operate when the defective container 5a reaches the rejection unit 8.

The rejecting unit 8 preferably comprises a pusher rod 19 controlled by an air piston 32 and connected to a suitable source of compressed air. When the container 5a with cocked cap 7a thereon reaches a position in front of pusher rod 19, the memory unit 9 will cause the air motor 32 to advance and move the container 5a off the conveyor 4.

Figures 1, 4, 5, 6:
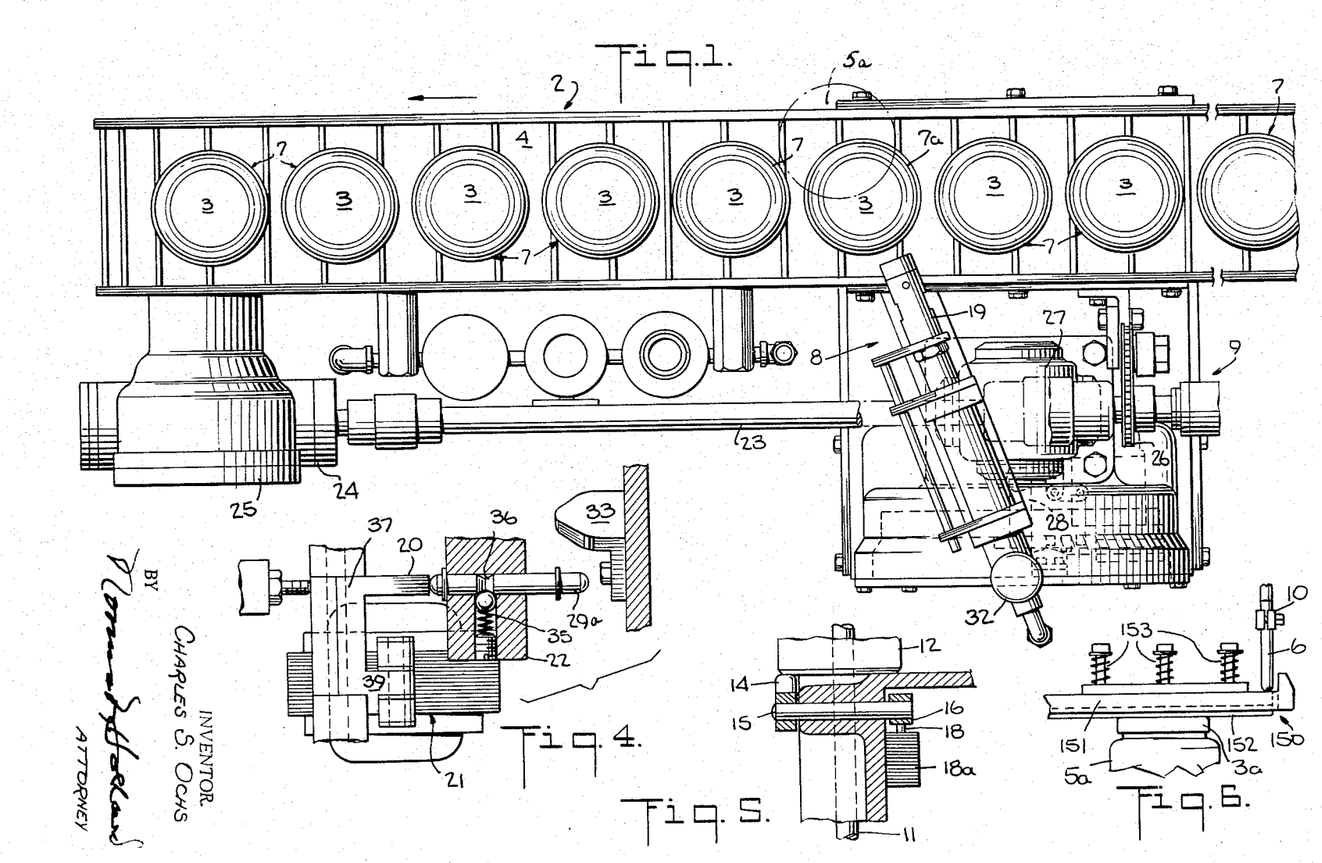
FIG. 1 is a plan view of an embodiment of the present invention showing the application of the invention to a straight line sealing machine.
FIG. 4 is a sectional view of a portion of a memory wheel taken along line 4—4 of FIG. 2.
FIG. 5 is a sectional view taken along line 5—5 of FIG. 3.
FIG. 6 is a side elevational view of the detecting fingers of the present invention.
Figures 3, 7:
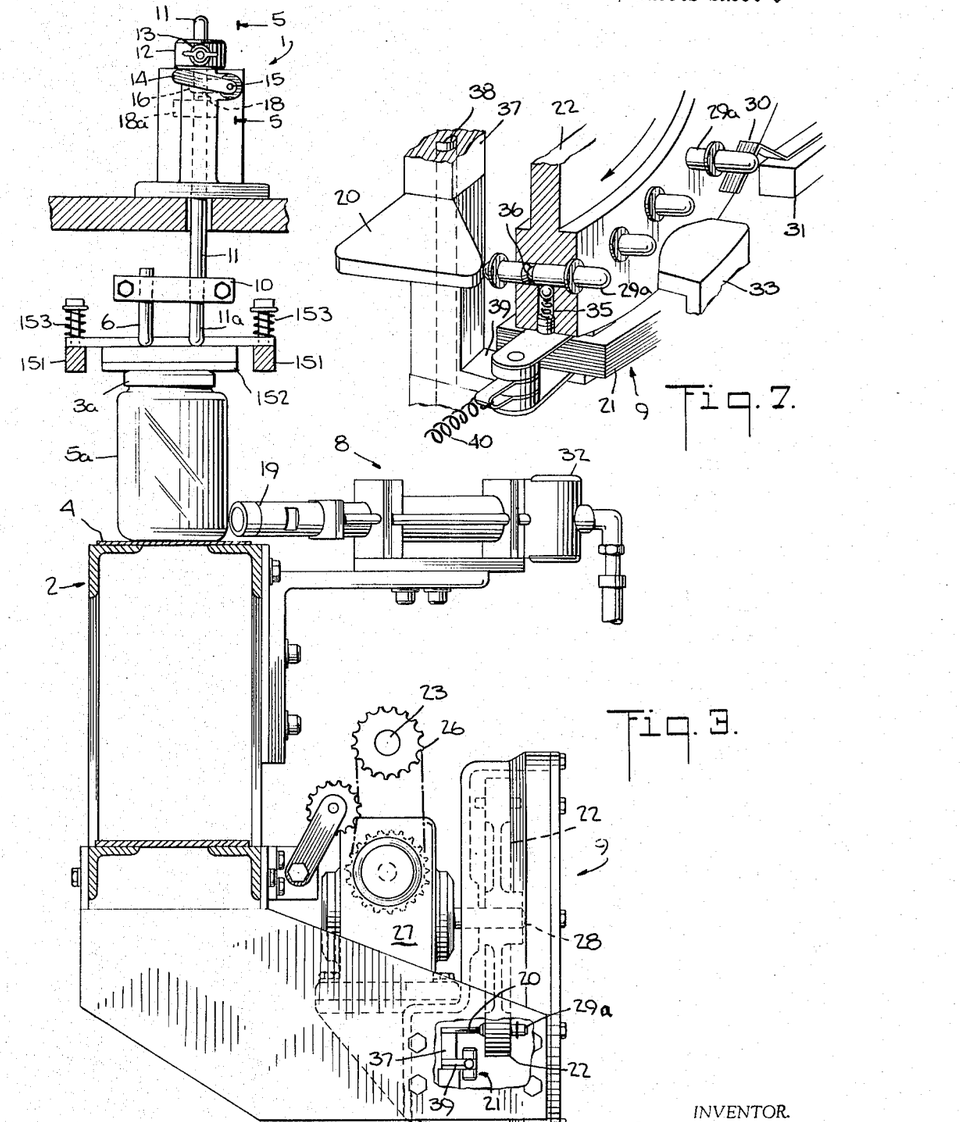
FIG. 3 is an end view of the detecting mechanism shown in FIG. 1.
FIG. 7 is a fragmentary perspective view showing the operation of the memory wheel.

The detecting unit 1 is shown in detail in FIGS. 3, 5 and 6 and comprises feeler fingers 6 and 11a depending from a split bracket 10. The split bracket 10 is mounted on a vertically-oriented reciprocable rod 11 (coextensive with feeler finger 11a). The rod 11 has a weight 12 mounted on its upper end held in place by means of a wing nut 13 or any other suitable means. The weight 12 in its down position is adapted to depress a lever arm 14 which is mounted on a shaft 15 as shown in FIG. 5. The two detecting fingers, 6 and 11a will respond to the position of the floating shoe 152 and will be raised whether a cap is cocked up from side to side or from front to back.

A switch depressing arm 16 is mounted on the other end of shaft 15 and is fast on shaft 15 so as to move down when the shaft 15 is rotated. The switch depressing arm 16 is normally positioned to depress a contact 18 of a detection switch assembly 18a, which normally maintains the circuit to the memory unit 9 open. The contact 18 is spring biased so as to move up to close the circuit when the force of the weight 12 acting through lever 14, shaft 15 and arm 16 is removed.

When a cocked cap 7a is sensed by the feeler fingers 6 and 11a, the rod 11 will be raised thereby lifting the weight 12 off the main lever arm 14. This releases the pressure of the arm 16 so that the contact 18 moves to an upper position thereby closing the circuit to the memory unit 9. When this occurs, the circuit energizes a solenoid 21 which moves a cam 20 into the position illustrated in FIG. 4 to move a pin 29a on memory wheel 22 to an extended position, as will be described in greater detail hereinbelow.

The cam 20 is mounted on a sleeve 37 pivotably mounted on rod 38 and having a lower extension 39 connected with the armature of solenoid 21. When the circuit to solenoid 21 is closed by switch 18a, the solenoid is energized and its armature pulls in thus rotating sleeve 37 and moving cam 20 inwardly toward memory wheel 22. A spring 40 is adapted to return the cam 20 to its original position when the solenoid 21 is deenergized.

Figure 2:
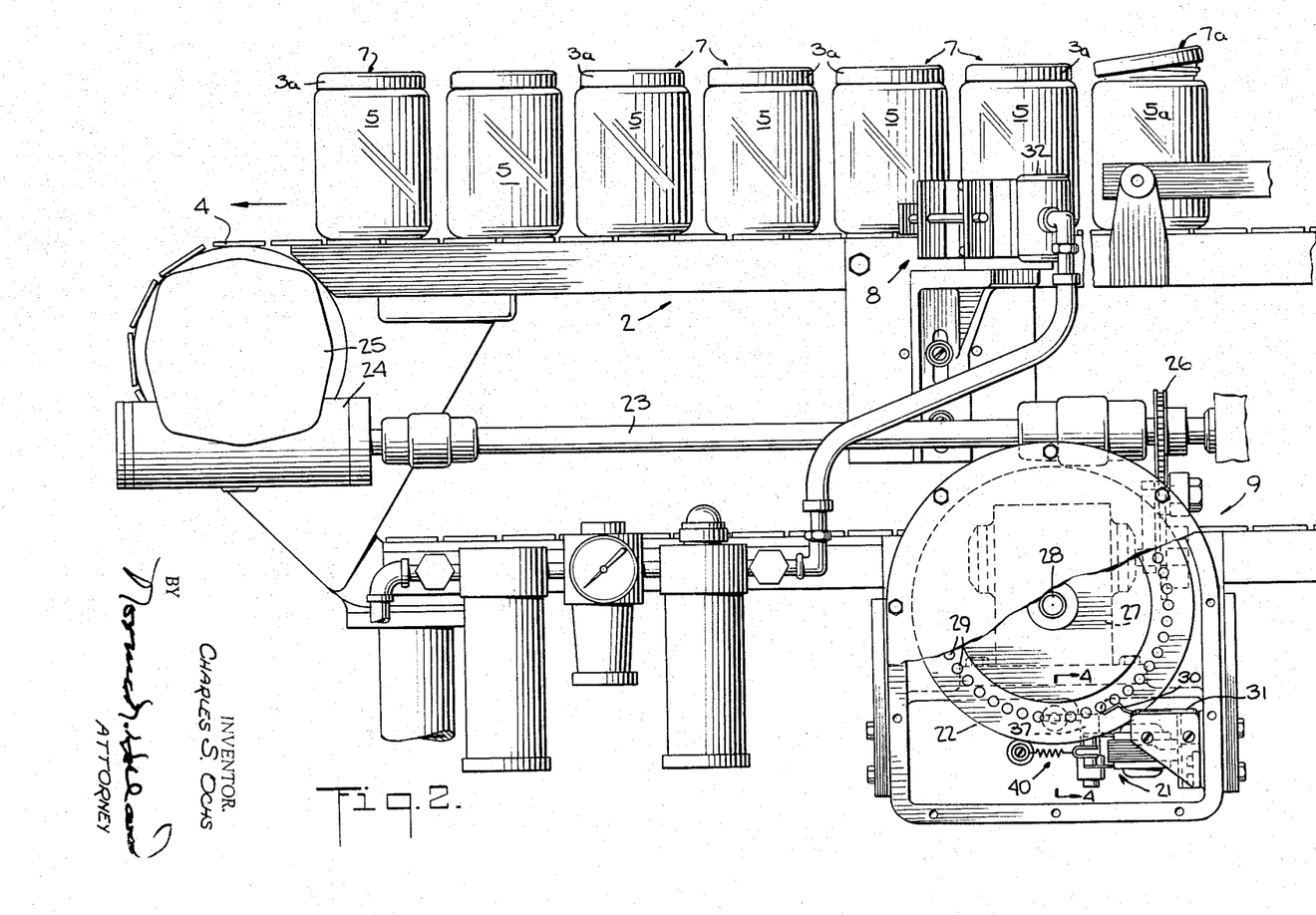
FIG. 2 is a side elevational view of the detecting mechanism shown in FIG. 1.

The memory unit 9 is shown in detail in FIGS. 2, 4 and 7 and comprises a memory wheel 22 which is rotated in synchronism with the movement of the conveyor 4 through the intermediation of the shaft 28, gearing (not shown) in gear box 27 and chain and sprocket 26.

The memory wheel 22 has a plurality of pins 29 along a peripheral zone thereof which extend through wheel 22 and protrude from each side thereof. Each pin 29 is movable from a normally retracted position (FIG. 7) to an extended position (FIG. 4) by means of the cam 20 (which is moved toward the memory wheel 22 when the solenoid 21 is energized in response to the closing of detection switch 18 under the control of the feeler finger 6 as described above).

The cam 20 strikes a pin 29a and moves it to its extend position. A spring pressed ball lock 35 is adapted to cooperate with grooves 36 in pin 29a to hold the pin 29a in its extended position.

As the memory wheel 22 rotates the extended pin 29a strikes a contact arm 30 of a rejection switch 31 which is in circuit with the air motor 32 of the rejection assembly 8. The air motor 32 moves the pusher rod 19 outwardly to move container 5a out of line.

The conveyor 4 and the memory wheel 22 are moving in synchronism with each other so that the time for moving the container from the detecting unit 1 to a position in front of pusher rod 19 is equal to the time the extended pin 29a moves from a position adjacent the cam 20 to a position where it strikes the contact arm 30. Thus the container is in front of the pusher rod 19 when the switch 31 operates the air motor 32 to cause the pusher rod 19 to move forward and move the defective container out of line.

The memory wheel 22 has a sufficient number of pins 29 so that regardless of the timed relationship between the memory wheel 22 and the containers 5 on the conveyor 4, at least one pin 29 represents the smallest space possible for the container 5 to occupy. By way of example, if 2 inch diameter containers are being inspected, a minimum of 7 pins 29 would represent each foot of a conveyor 4 between the detection and ejection points so that no matter where the container might be on the conveyor it would be represented by at least one pin.

The pin actuating cam 20 is designed so that, even though it might be actuated between pins 29, at least one pin is tripped, i.e., the one most closely representing the location of the container on the conveyor.

A suitable dog 33 is provided adjacent the memory wheel 22 which strikes the extended pins 29a to return them to their original retracted position.

The operation of the embodiment shown in FIGS. 1 to 7 will be obvious from the above description. Containers 5 are moved underneath the floating shoe 152 which actuates the feeler fingers 6 and 11a. If the caps 7 are properly positioned on the containers the feeler fingers 6 and 11a are not disturbed.

However, if a container 5a has a cocked cap 7a thereon, the feeler fingers 6 and 11a will be raised by the shoe 152 which is tilted and the detection switch 18a will close a circuit to solenoid 21 to energize it. When solenoid 21 is energized, a cam 20 is moved toward the rotating memory wheel 22 and will strike a pin 29a to move it to an extended position. The memory wheel 22 rotates until the extended pin 29a reaches a position where it will strike contact arm 30 of the rejection switch 31 to close a circuit to the air motor 32 and cause the pusher rod 19 to move forward. At the same time, the container 5a will have moved to a position in front of the pusher rod 19 so that the pusher rod 19 will move the container 5a out of line.

The embodiment of the invention illustrated in FIGS. 8 to 17 shows the invention as applied to a rotary sealing machine designated generally by the reference numeral 50.

Figures 8, 16:
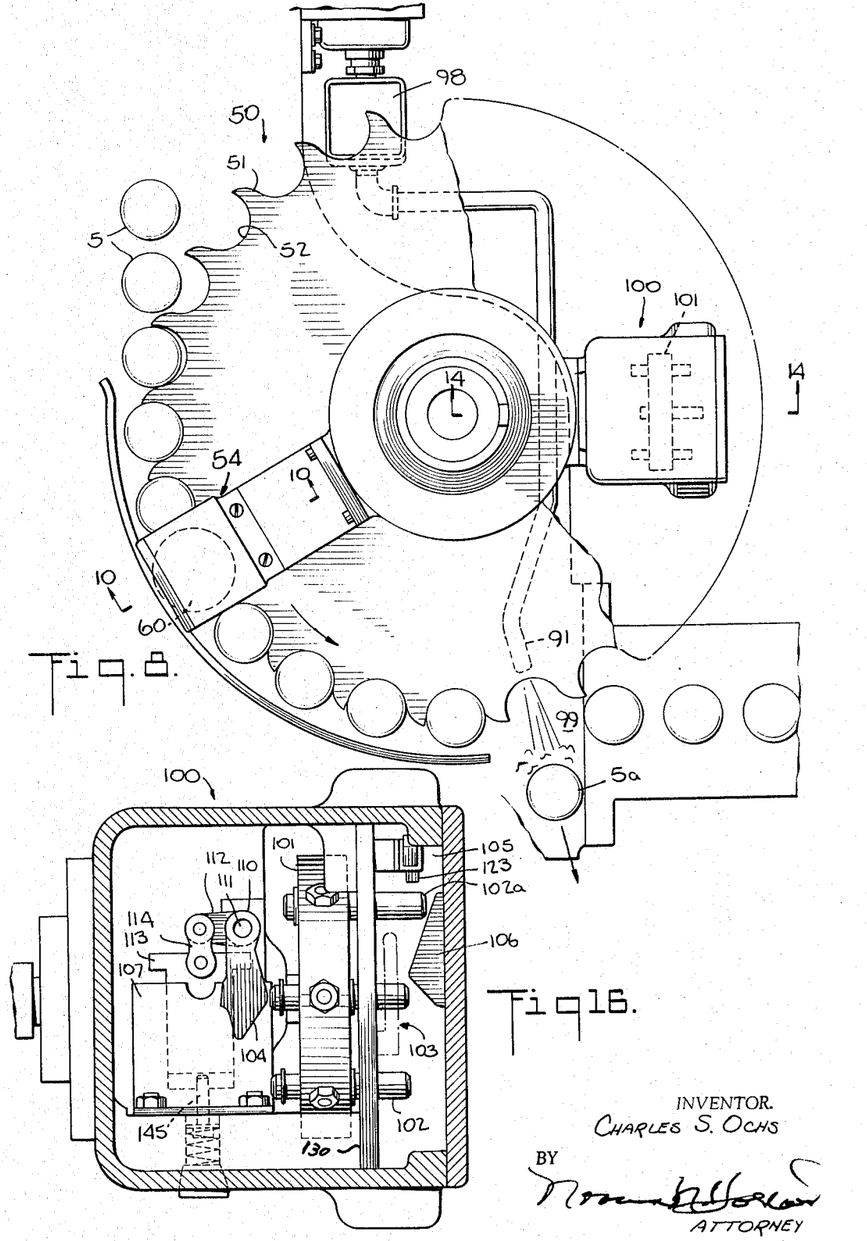
FIG. 8 is a top plan view showing another embodiment of the present invention and in particular showing the application of the invention to a rotary sealing machine.
FIG. 16 is a sectional view of the memory wheel taken along line 16—16 of FIG. 15.
Figure 9:
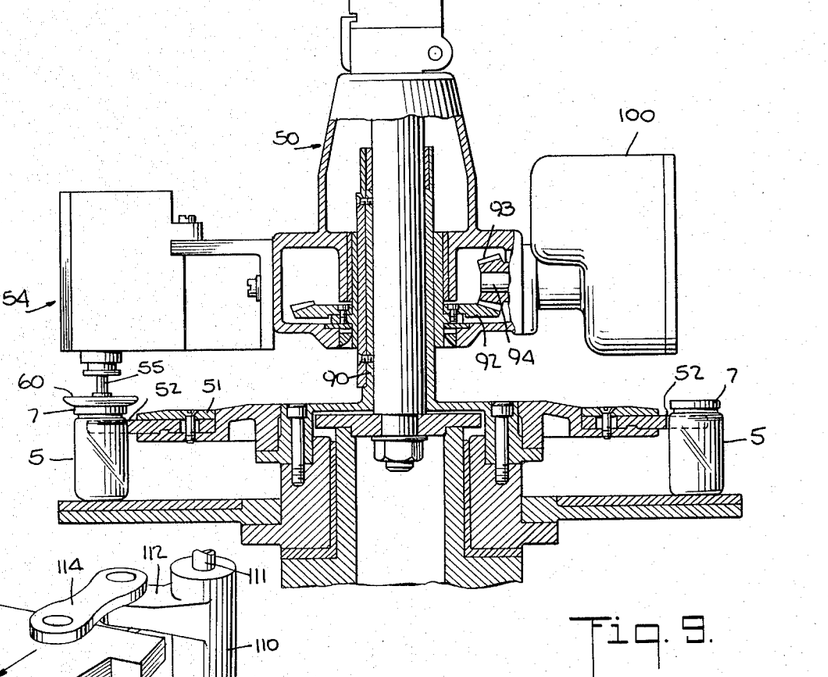
FIG. 9 is a sectional view of the detecting mechanism shown in FIG. 8.
Figure 10:
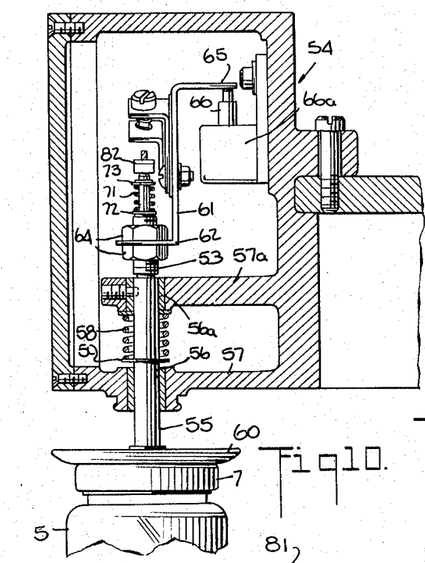
FIG. 10 is a sectional view taken along line 10—10 of FIG. 8.
Figure 11:
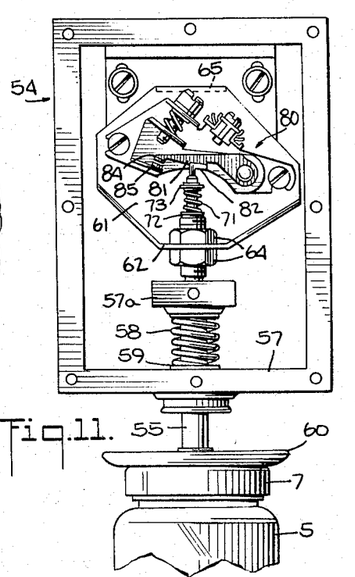
FIG. 11 is a front elevational view of the detecting unit of FIG. 10 with the cover plate removed showing the various contacts.

The rotary machine 50 comprises a star wheel 51 having a plurality of pockets 52 each adapted to receive a container 5. The containers 5 are moved by the star wheel 51 beneath a detection unit 54 which detects whether the closure caps 7 on the containers 5 are improperly positioned thereon. If the detection unit 54 detects a container 5a with a cocked cap 7a, a memory unit 100 is activated which stores this fact. When the defective container 5a is moved in front of an air ejection nozzle 91 the memory unit 100 causes a blast of air to be released from air nozzle 91 to move the container 5a out of the star wheel 50.

The detection unit 54 is shown in detail in FIGS. 10 to 13 and comprises a hollow spindle 55 which is slidably mounted in aligned bores 56 and 56a in the lower frame 57 of a detector housing and arm 57a, respectively. A spring 58 located between arm 57a and a retainer ring 59 fast on spindle 55 urges the hollow spindle 55 into its lowermost position.

The spindle 55 is threaded at its upper end 53 and supports switch plate 61 by means of lower outwardly directed flange 62 and retaining nuts 64. A shaft 70 is mounted within the hollow spindle 55 and is supported therein by a spring 71 and retainer rings 72 and 73 for permitting relative axial movement between the shaft 70 and the spindle 55. The inner shaft 70 terminates in a flanged head 74 at its lower end and has a detector plate 60 mounted thereon.

The detector plate 60 has a dished body portion with two concentric cylinders 67 and 68 extending upwardly therefrom. The inner cylinder 67 receives the head 74 of the shaft 70 and holds the head 74 in place by means of retainer rings 67a and 67b. The lower portion 59a of the spindle 55 has an outward flange 59a which is accommodated within the outer cylinder 68 and is held in place by means of a retainer ring 68a.

Figures 12, 13:
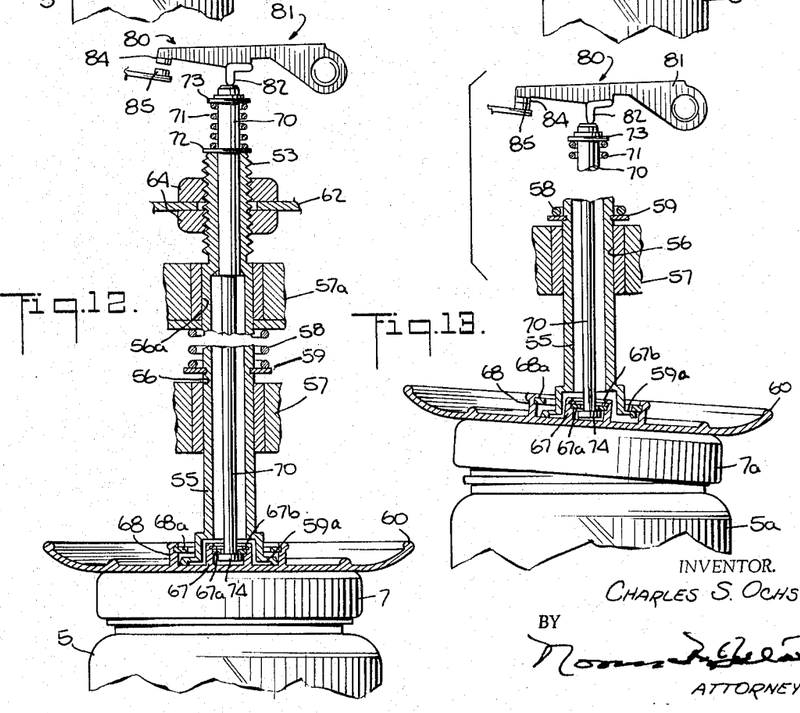
FIG. 12 is a sectional view of the detecting unit of FIG. 10 and showing the position of the parts when sensing a container that is not defective.
FIG. 13 is an exploded sectional view showing the operation of the unit of FIG. 10 when detecting a cocked cap.
Figure 14:
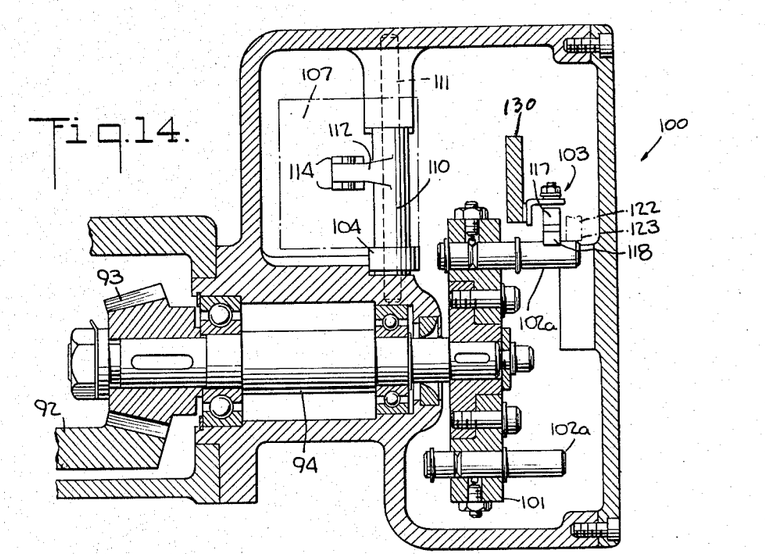
FIG. 14 is a sectional view taken along line 14—14 of FIG. 8 and showing the memory wheel.
Figure 15:
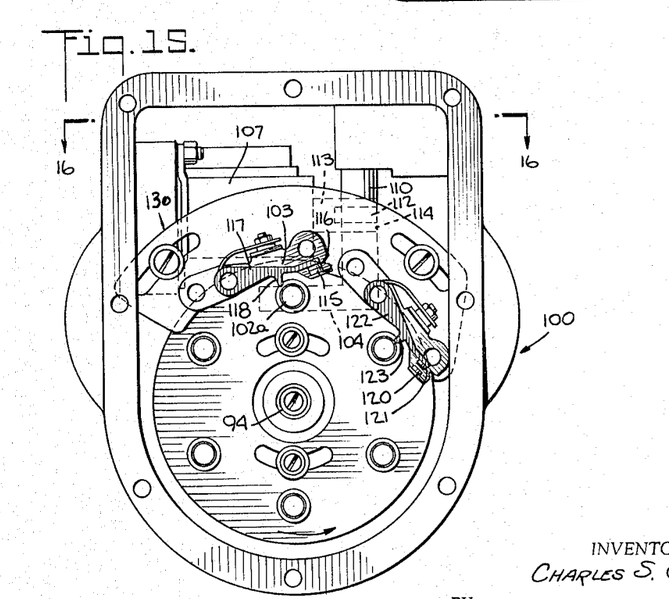
FIG. 15 is a front elevational view of the memory wheel of FIG. 14 with the cover plate removed showing the position of the various switches.
Figure 17:
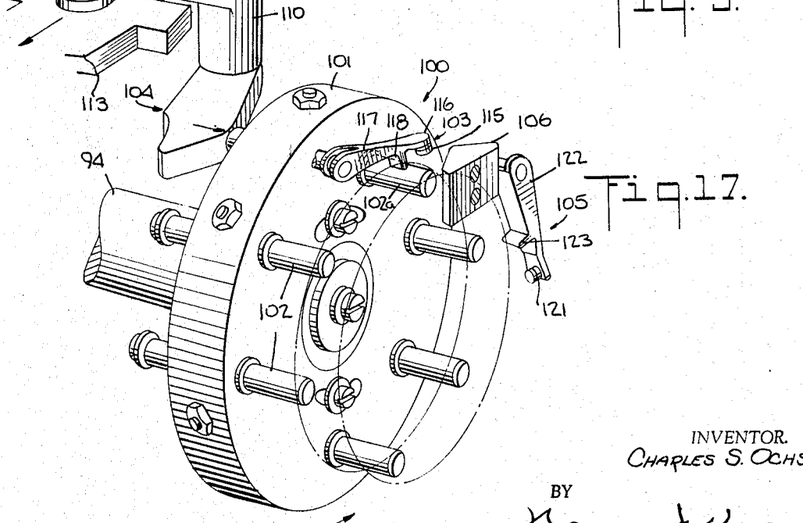
FIG. 17 is a perspective view of the memory wheel shown in FIG. 16.

With this structure any tilting movement of the detector plate 60 induces a relative axial movement between the shaft 70 and the spindle 55. As illustrated in FIG. 13, tilting of the detector plate 60 will pull the inner shaft 70 downwardly.

Located above the inner shaft 70 and mounted on the switch plate 61 is a contact arm 81 of a detection switch assembly 80. The detection switch 80 has a contact 84 on arm 81 adjacent stationary contact 85. The arm 81 is provided with depending finger 82 which sits on top of the shaft 70. When the detector plate 60 is tilted (as by a cocked cap) shaft 70 is moved downward relative to the hollow spindle 55 to cause the arm 81 to be lowered and close the contacts 84 and 85 and energize the memory unit 100.

The switch plate 61 has an upper inwardly extending arm 65 which overlies the contact 66 of a no jar switch 66a. When both shafts 70 and 55 are lowered as a body (as when there is a broken jar) the switch plate 61 is bodily lowered and the arm 65 depresses contact 66 to close no jar micro-switch 66a.

In operation the detector plate 60 engages the closure cap 7 of each container 5 passing therethrough. The containers 5 are sufficiently close together that in normal operation the detector plate "floats" from closure cap to closure cap and maintains a generally level orientation.

Should a container 5a having a cocked cap 7a pass beneath the detecting unit, the detector plate 60 will tilt (FIG. 13) to cause a lowering of the shaft 70 relative to spindle 55 so that the contacts 84 and 85 will be closed. This causes the memory unit to be activated as will be described in greater detail hereinbelow.

The detecting unit will not close the contacts 84–85 by purely vertical movement since there is no relative movement between the shaft 70 and the hollow spindle 55. Thus, the detecting unit operates independently of variations in container height and responds only to tilting of plate 60 by a cocked closure cap 7a.

When no jar passes beneath the detecting unit 54, the detector plate 60, spindle 55, switch plate 61, and shaft 70 are bodily lowered so that contact 66 is depressed to close the no jar switch 66a which stops the machine.

The memory unit 100 is shown in FIGS. 14 to 17 and is adapted to store or memorize the fact that the detection unit 54 has detected a defective container and to energize the rejection unit when the defective container is in front of air nozzle 91.

The memory wheel unit 100 comprises a memory wheel 101 which is driven in synchronization with the star wheel 51 (FIGS. 9 and 14) through the intermediation of rotatable sleeve 90, bevel gears 92 and 93 and a shaft 94.

Memory wheel 101 has a plurality of peripherally located pins 102 therein which protrude from each side thereof. Each pin 102 is movable by a cam 104 from a normal retracted position to an extended position when a defective container has been detected by the detecting unit.

The cam 104 extends from a sleeve 110 rotatably mounted on a shaft 111. Sleeve 110 has an arm 112 extending therefrom which is connected to armature 113 of a solenoid 107 by links 114. A spring pressed plunger 145 biases the armature 113 to an outward position so that the cam 104 is normally in a retracted position.

When the solenoid 107 is energized by the detection unit 54 sensing a container with a cocked cap, the armature 113 is pulled in thereby rotating sleeve 110 and moving cam 104 to its extended position where it strikes a pin 102a and moves it to extended position.

A timing switch 103 is mounted on bracket 130 and comprises stationary contacts 115 and movable contact 116 mounted on lever 117 which is mounted in close adjacency to memory wheel 101 on the side opposite cam 104. The lever 117 is provided with a depending finger 118 which is adapted to be struck by pins 102 while in retracted position to open contacts 115 and 116. The timing switch 103 is in circuit with the detection switch 80 of the detection unit 54 so that detection switch 80 is not effective unless contacts 115 and 116 of timing switch 103 are open.

The synchronization between the memory wheel 100 and the star wheel 51 is such that each pin 102 is timed to contact finger 118 of lever 117 and close the timing switch 103 only when a container 5 is positioned centrally with respect to the detector plate 60. Thus when a cocked cap 7a is detected and detector switch 80 of FIG. 12 is closed by the tilted detector plate 60, the detector plate 60 is centrally positioned over the container at the same time contacts 115 and 116 of the timing switch 103 are opened by the finger 118 being struck by pin 102a. The solenoid 107 is energized to move memory cam 104 to its extended position so that it strikes and moves pin 102a to its extended position.

It is to be understood that, by virtue of the timing switch 103, described above, any tilting of the detector plate 60 when it is coming onto or leaving the closure cap of a container will not actuate the pin setting cam 104 since the circuit is closed only when the timing switch 103 is open, i.e., when the feeler plate 60 is positioned centrally above the container.

The extended pin 102a is then moved by the memory wheel 101 until it opens a rejection switch 105 also mounted on bracket 130 and positioned a distance from the memory wheel greater than the distance between memory wheel 101 and timing switch 103. The rejection switch 105 comprises stationary contact 120 and movable contact 121 on lever 122 which has a finger 123 depending therefrom. The contacts 120 and 121 of rejection switch 105 are opened by the extended pin 102a striking finger 123 of lever 122 to open contacts 120 and 121.

Meanwhile the container 5a with cocked cap 7a has been moved by the star wheel 51 to the ejection station 99 (FIG. 8) in front of air nozzle 91. The movement of the star wheel 51 and memory wheel 101 are so synchronized that container 5a reaches a position in front of air nozzle 91 when extended pin 102a strikes finger 123 of lever 122. When the contacts 120 and 121 of the rejection switch 105 are opened by the extended pin 102a the air valve 98 opens and a jet of air under pressure is ejected from nozzle 91 to remove the defective container from the pockets of star wheel 51.

A dog 106 then resets the extended pin 102a to its retracted position.

The operation of the embodiment shown in FIGS. 8 to 17 is apparent from the above description. Containers are moved beneath the plate 60 of the detection unit 54 by the star wheel 51. If a container 5a has a cocked cap 7a thereon, the plate 60 will be tilted so that the inner shaft 70 is pulled down relative to spindle 55 to close contacts 84 and 85 of detection switch 80. At the same time, the contacts 115 and 116 of the timing switch 103 adjacent memory wheel 101 are opened by the pin 102a striking the finger 118 on lever 117. This energizes a solenoid 107 which causes the cam 104 to be moved to its extended position. Thus a memory of the cocked cap has been retained by the memory wheel in the form of extended pin 102a.

The container is now moved by the star wheel 51 to a position in front of air nozzle 91 and simultaneously therewith the extended pin 102a is moved by the memory wheel 101 to a position where it strikes finger 123 of the rejection switch 105. At this point, the contacts 120 and 121 of the rejection switch 105 are opened by pin 102a so that a blast of air is ejected from the air nozzle 91 to move the container out of line.

In the event there is no container beneath the detecting unit, the switch 66a is closed to stop the machine.

While the present invention has been described with respect to a detecting mechanism for detecting cocked caps, it will be understood that the invention may also be used to detect articles for other defects.

It will be seen that the present invention provides improved detecting mechanism for detecting the presence of a cocked cap which has improved means for memorizing defective containers and which may operate at high speeds.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having described my invention, I claim:

1. A detecting mechanism comprising conveying means having an unpartitioned moving surface member for supporting articles therein at any degree of spacing between adjacent articles and for moving said articles in randomly spaced fashion past a detecting unit, said detecting unit having means for inspecting said articles passing thereby, a memory device having a plurality of pins therein movable between a retracted and an extended position, said memory device being moved in synchronism with said conveying means, extending means responsive to said inspecting means for moving a pin to an extended position when said inspecting means detects a defective article, a rejection unit spaced from said detecting unit, means responsive to said extended pin for operating said rejection unit to reject said defective article, the time for said extended pin to traverse the distance between said extending means and said operating means being substantially equal to the time for the defective article to traverse the distance between said detection unit and said rejection unit, there being a sufficient number of pins in said memory device so that at least one of said pins represents the minimum space occupied by each article, whereby at least one pin on said memory device represents a container regardless of the position of the container on said conveying means.

2. A detecting mechanism as claimed in claim 1 wherein said inspecting means comprises a detecting finger for inspecting articles passing thereby, detection switch means responsive to said detecting finger adapted to be activated responsive to said detecting finger, a solenoid responsive to said detection switch means, a cam movable by said solenoid for moving a pin to an extended position when said detection switch means is activated by the finger sensing a defective article, rejection switch means responsive to the extended pin on said memory device for operating said rejection unit to reject said defective article, and means for returning said extended pin back to its retracted position.

3. A detecting mechanism as claimed in claim 2 wherein said detecting unit is a cocked cap detecting unit and wherein said detecting finger depends from a split bracket, a rod extends upwardly from said split bracket and is axially movable, said detection switch means being adapted to be activated responsive to the movement of said rod.

4. A cocked cap detecting unit as claimed in claim 3, wherein said split bracket has a pair of detecting fingers depending therefrom and wherein said upstanding rod is coextensive with one of said detecting fingers.

5. A detecting mechanism comprising conveying means for moving articles past a detecting unit, said detecting unit having a tiltable detecting plate for inspecting said articles passing thereby, a rod extending upwardly from said detecting plate and operatively associated therewith, said plate having a portion adapted to strike said rod when the plate is tilted whereby tilting of the plate will impart axial movement to the rod, detection switch means adapted to be activated responsive to the movement of said rod, a memory device having a plurality of pins therein movable between a retracted and extended position, said memory device being moved in synchronism with said moving articles, extending means responsive to said detection switch means for moving a pin to an extended position, a rejection unit spaced from said detecting unit, means responsive to said extended pin for operating said rejecting unit to reject said defective article, the time for the extended pin to traverse the distance between said cam means and said rejection switch means being substantially equal to the time for the article to traverse the distance between said detection unit and said rejection unit, timing switch means in circuit with said detection switch means and responsive to a pin when in retracted position to close the circuit to the detection switch means, and means for returning the extended pin back to its retracted position.

6. A detecting mechanism as claimed in claim 5 wherein a solenoid is provided responsive to said detection switch means, a cam movable by said solenoid for moving a pin to an extended position when said detection switch means are activated by the sensing of a defective article by the detection plate.

7. A detecting mechanism as claimed in claim 6 wherein said articles are containers with closure caps thereon and said detecting plate inspects the position of said closure caps on the containers passing thereby, and wherein said detection switch means is activated by the finger sensing a cocked cap on a container.

8. A cocked cap detecting mechanism as claimed in claim 7 wherein said detecting unit comprises an outer spindle movably mounted on said detection plate and wherein said rod is mounted within said spindle and movably mounted on the detection plate.

9. A detecting mechanism as claimed in claim 8, wherein a no jar switch is adjacent said outer spindle and is adapted to be activated when said spindle is lowered.

10. A detecting unit as claimed in claim 8 wherein the timing switch means is adapted to be activated when said detection plate is centrally over said containers.

11. A detecting unit for a detecting mechanism comprising a frame, a split bracket associated with said frame, a pair of feeler fingers extending downwardly from said bracket, a rod extending upwardly from the bracket and coextensive with one of said fingers, a weight mounted on said rod, a shaft in said frame transversely of said weight, a first lever arm on said shaft and under said weight, a second lever arm on said shaft spaced from said first lever arm, and a switch beneath said second lever arm.

References Cited by the Examiner

UNITED STATES PATENTS

| | | | |
|---|---|---|---|
| 1,874,353 | 8/1932 | Ross | 141—159 X |
| 2,132,447 | 10/1938 | Stout | 209—74 |
| 2,400,507 | 5/1946 | Henszey et al. | 209—88 X |
| 2,689,647 | 9/1954 | Hofstetter et al. | 209—90 |
| 3,073,034 | 1/1963 | Antoszewski | 209—88 X |
| 3,237,764 | 3/1966 | Kochalski et al. | 209—88 |

M. HENSON WOOD, JR., *Primary Examiner.*

ROBERT B. REEVES, *Examiner.*

C. H. SPADERNA, *Assistant Examiner.*